M. KNICKERBOCKER.
BARBED FENCE-WIRE.
No. 185,333
Patented Dec. 12, 1876.
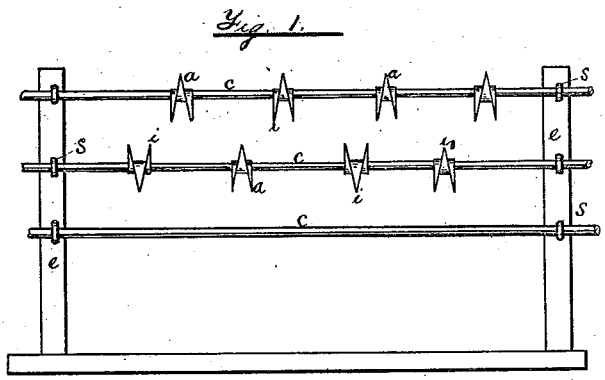
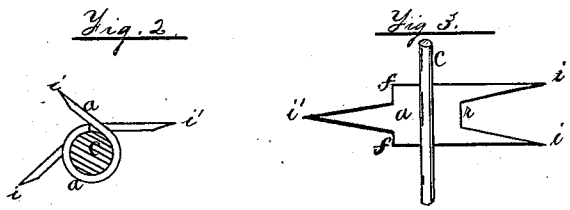
Witnesses
Thos. H. Hutchins
J. P. Ford
Inventor
Millis Knickerbocker

UNITED STATES PATENT OFFICE.

MILLIS KNICKERBOCKER, OF NEW LENOX, ASSIGNOR OF THREE-FOURTHS OF HIS RIGHT TO AMOS N. KLINEFELTER AND EZRA L. SPANGLER, OF JOLIET, ILLINOIS.

IMPROVEMENT IN BARBED FENCE-WIRE.

Specification forming part of Letters Patent No. 185,333, dated December 12, 1876; application filed April 7, 1875.

*To all whom it may concern:*

Be it known that I, MILLIS KNICKERBOCKER, of New Lenox, in Will county, and State of Illinois, have invented certain Improvements in Barbed-Wire Fences, of which the following is a specification:

The nature of my invention consists in attaching to the wires of a wire fence sharp-pointed barbs constructed of thin flat metal entwined around the wire, with the points projecting in every direction, for the purpose of preventing cattle and other stock from rubbing or pushing against the fence, the construction and operation of which I will proceed to explain, reference being had to the annexed drawings, making a part of this specification, in which—

Figure 1 is a side elevation of the fence, showing the barbs attached and applied to the wires; Fig. 2, a cross-sectional view of a wire with a barb attached; and Fig. 3, a plan view on the top of one of the flat pieces of metal, cut out for a barb before it is applied to the wires.

Referring to the drawings, $c$ represents the wires of the fence; $e$, the posts; $s$, the staples driven in the posts to hold the wires on; and $a$ the barbs to be applied to the wires of the fence.

Fig. 2 represents the barb $a$ as it appears bent around and applied to the wire, with the points $i$ and $i'$ caused to point in any direction. In order to apply the barbs to the wire they are placed against the wire, as shown in Fig. 3, and then the single-pointed end $i'$ is bent around into the crotch $r$, between the two points $i$, until they appear as in Figs. 1 and 2.

By the application of barbs to the wires, as set forth, cattle and horses will not rub or push against the fence, and the barbs $a$ may be applied to any old wire fence, or even to poles or strips of wood.

Barbs cut out of sheet metal in this form have the advantage of being cut so the points may bend with the grain of the iron; also, by being bent around the wire, as shown, there are no bends in the metal forming the barbs at right angles, as has been done in other cases, so the metal is not cracked and weakened at the bend, so as to make them more liable to rust and get broken off.

It will be observed that the points $i$ have a wide strong base, which is parallel with the wires of the fence, so that they have great strength in the direction of the length of the fence so it is very difficult for stock to break off one of these points, as has been the case in all other fences of this nature where similar barbs are used.

The shoulders $ff$, Fig. 3, form a rest for the forked points $i$ to rest on, more particularly shown in Fig. 2; also, $r$ forms a shoulder for the point $i'$ to rest on. These shoulders $f$ $f$ and $r$ prevent the points $i$ $i$ and $i'$ from wrapping any farther around the wire, giving them more firmness than when used without shoulders.

Having thus described my invention, what I claim as new, and desire to secure by Letters Patent, is as follows:

The sheet-metal barb $a$, having the shoulders $f$ $f$ $r$ forming supports for the points $i$ $i$ and $i'$ when wrapped around the wire $c$, as and for the purposes set forth.

MILLIS KNICKERBOCKER.

Witnesses:
 THOS. H. HUTCHINS,
 T. P. FORD.